(12) United States Patent
Ren et al.

(10) Patent No.: US 10,077,728 B1
(45) Date of Patent: Sep. 18, 2018

(54) ENGINE PUMP LOSS CONTROL TO IMPROVE BATTERY SYSTEM CHARGING AND OVERALL VEHICLE EFFICIENCY

(71) Applicants: Zhen Ren, Troy, MI (US); Songping Yu, Troy, MI (US); Mohamed Othman, Troy, MI (US); Ryan C Masters, Auburn Hills, MI (US); Anandhi Koteeswaran, Farmington Hills, MI (US); Marcio Quiles, Lake Orion, MI (US)

(72) Inventors: Zhen Ren, Troy, MI (US); Songping Yu, Troy, MI (US); Mohamed Othman, Troy, MI (US); Ryan C Masters, Auburn Hills, MI (US); Anandhi Koteeswaran, Farmington Hills, MI (US); Marcio Quiles, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/670,521

(22) Filed: Aug. 7, 2017

(51) Int. Cl.
| | |
|---|---|
| *B60W 10/06* | (2006.01) |
| *F02D 41/12* | (2006.01) |
| *B60W 20/50* | (2016.01) |
| *B60W 10/08* | (2006.01) |
| *B60W 20/16* | (2016.01) |
| *B60W 20/13* | (2016.01) |
| *F02D 41/04* | (2006.01) |

(Continued)

(52) U.S. Cl.
CPC ........... *F02D 41/123* (2013.01); *B60W 10/08* (2013.01); *B60W 20/13* (2016.01); *B60W 20/16* (2016.01); *B60W 20/50* (2013.01); *F02D 41/042* (2013.01); *B60K 2006/268* (2013.01); *B60W 2510/305* (2013.01); *F02N 11/0851* (2013.01); *F02N 2200/022* (2013.01); *F02N 2200/061* (2013.01)

(58) Field of Classification Search
CPC .. F02D 41/123; F02D 41/042; F02D 41/0005; F02D 41/405; F02D 41/126; F02D 2011/102; B60W 20/13; B60W 20/16; B60W 20/50; B60W 10/08
USPC ............... 123/399, 481, 436, 325, 332, 333; 701/103, 104, 105, 110, 112, 113
See application file for complete search history.

(56) References Cited

U.S. PATENT DOCUMENTS

| | | |
|---|---|---|
| 5,725,064 A | 3/1998 | Ibaraki et al. |
| 6,694,232 B2 | 2/2004 | Saito et al. |

(Continued)

*Primary Examiner* — Hai Huynh
*Assistant Examiner* — Gonzalo Laguarda
(74) *Attorney, Agent, or Firm* — Ralph E. Smith

(57) ABSTRACT

Techniques for a mild hybrid vehicle utilize a control system for detecting a deceleration fuel shutoff (DFSO) event where fueling to an engine is disabled and in response to detecting the DFSO event: determining a desired pumping loss for the engine based on a parameter of a battery system, the desired pumping loss corresponding to a desired amount of electrical energy that a motor generator unit (MGU) of a belt-driven starter generator (BSG) system will generate to charge the battery system; commanding a throttle valve of the engine to an initial position determined based on the desired engine pumping loss and a speed of the engine; estimating an actual pumping loss of the engine based on an estimated airflow into the engine; and adjusting the position of the throttle valve based on a difference between the desired and actual engine pumping losses.

16 Claims, 2 Drawing Sheets

(51) Int. Cl.
 *F02N 11/08* (2006.01)
 *B60K 6/26* (2007.10)

(56) References Cited

U.S. PATENT DOCUMENTS

| | | | |
|---|---|---|---|
| 6,945,905 B2* | 9/2005 | Tamai | B60K 6/48 |
| | | | 477/107 |
| 7,490,685 B2 | 2/2009 | Aoki et al. | |
| 8,086,390 B2 | 12/2011 | Whitney et al. | |
| 8,932,179 B2* | 1/2015 | Banker | B60W 10/184 |
| | | | 477/185 |
| 9,328,672 B2* | 5/2016 | Serrano | F02D 17/02 |
| 9,447,747 B2* | 9/2016 | Gibson | F02N 11/0855 |
| 2012/0017868 A1* | 1/2012 | Rammer | F01L 13/06 |
| | | | 123/323 |
| 2014/0034010 A1* | 2/2014 | Serrano | F02D 17/02 |
| | | | 123/324 |

* cited by examiner

ENGINE PUMP LOSS CONTROL TO IMPROVE BATTERY SYSTEM CHARGING AND OVERALL VEHICLE EFFICIENCY

FIELD

The present application generally relates to mild hybrid vehicles and, more particularly, to engine pump loss control to improve battery system charging and overall vehicle efficiency.

BACKGROUND

Mild hybrid vehicles often include a belt-driven starter generator (BSG) system that includes a motor generator unit (MGU) physically coupled to a crankshaft of an engine and electrically connected to a battery system of the vehicle. The BSG system controls the MGU to operate as either a torque generator (e.g., for starting or restarting the engine) or a torque consumer (e.g., to charge the battery system). When operating as a torque generator, the MGU is powered by electrical energy provided by the battery system to drive the crankshaft. When operating as a torque consumer, the MGU is powered by the crankshaft. One operating scenario where the BSG system typically operates the MGU as a torque consumer is a deceleration fuel shutoff (DFSO) event. During a DFSO event, a throttle valve of the engine is typically closed and engine pumping loss is near its maximum. By modifying engine operation to reduce pumping losses and using this pumping loss delta for electricity generation via the MGU, the vehicle performance remains the same while operation efficiency (e.g., fuel economy) is increased.

Due to various operational constraints (noise/vibration/harshness (NVH), emissions, etc.), however, modified engine operation to reduce pumping losses must be actively and tactically controlled. One method of reducing engine pumping losses is opening the throttle valve to improve engine breathing. The MGU, however, is only able to absorb a certain amount of the pumping loss reduction achievable by opening the throttle valve. A very complex, non-linear empirical approach involving many calibration tables based on dynamometer mapping is typically used to determine the desired pumping loss/throttle valve position. This approach, however, requires extensive calibration effort and memory storage for each application. Accordingly, while such mild hybrid vehicle control systems work well for their intended purpose, there remains a need for improvement in the relevant art.

SUMMARY

According to one example aspect of the invention, a system for a mild hybrid vehicle is presented. In one exemplary implementation, the system comprises a belt-driven starter generator (BSG) system comprising a motor generator unit (MGU) physically coupled to a crankshaft of the engine, the MGU being electrically connected to a battery system of the vehicle and a control system configured to: detect a deceleration fuel shutoff (DFSO) event where fueling to the engine is disabled; and in response to detecting the DFSO event: determine a desired pumping loss for the engine based on a parameter of the battery system, the desired pumping loss corresponding to a desired amount of electrical energy that the MGU will generate to charge the battery system; determine an initial position for a throttle valve of the engine based on the desired engine pumping loss and a speed of the engine; command the throttle valve to the initial position; estimate an actual pumping loss of the engine based on an estimated airflow into the engine; and adjust the position of the throttle valve based on a difference between the desired and actual engine pumping losses.

In some implementations, the control system is configured to adjust the position of the throttle valve based on the difference between the desired and actual engine pumping losses for a remainder of the DFSO event. In some implementations, the parameter of the battery system is a state of charge (SOC) of the battery system, and wherein the control system is configured to adjust the position of the throttle valve based on the difference between the desired and actual engine pumping losses until the SOC reaches a predetermined SOC.

In some implementations, the control system is configured to determine the initial throttle valve position as a feedforward estimation using a look-up table relating various throttle valve positions to engine pumping losses and engine speeds. In some implementations, the control system is further configured to determine a feedback error based on the difference between the desired and actual engine pumping losses and to adjust the throttle valve position from the initial throttle valve position based on the feedback error.

In some implementations, the control system is configured to perform a closed-loop proportional-integral (PI) control scheme in determining the feedback error and adjusting the throttle valve position. In some implementations, the desired pumping loss corresponds to a maximum amount of engine pumping loss reduction that the MGU is able to convert to the electrical energy for charging the battery system. In some implementations, the DFSO event corresponds to an accelerator pedal of the vehicle being at a rest position and the throttle valve being at a minimum operating position.

According to another example aspect of the invention, a method of operating a mild hybrid vehicle having a belt-driven starter generator (BSG) system including a motor generator unit (MGU) physically coupled to a crankshaft of an engine of the vehicle and electrically connected to a battery system of the vehicle is presented. In one exemplary implementation, the method comprises detecting, by a control system of the vehicle, a deceleration fuel shutoff (DFSO) event where fueling to the engine is disabled and in response to detecting the DFSO event: determining, by the control system, a desired pumping loss for the engine based on a parameter of the battery system, the desired pumping loss corresponding to a desired amount of electrical energy that the MGU will generate to charge the battery system; determining, by the control system, an initial position for a throttle valve of the engine based on the desired engine pumping loss and a speed of the engine; commanding, by the control system, the throttle valve to the initial position; estimating, by the control system, an actual pumping loss of the engine based on an estimated airflow into the engine; and adjusting, by the control system, the position of the throttle valve based on a difference between the desired and actual engine pumping losses.

In some implementations, adjusting the position of the throttle valve based on the difference between the desired and actual engine pumping losses is performed for a remainder of the DFSO event. In some implementations, the parameter of the battery system is a state of charge (SOC) of the battery system, and wherein adjusting the position of the throttle valve based on the difference between the desired and actual engine pumping losses is performed until the SOC reaches a predetermined SOC.

In some implementations, the initial throttle valve position is determined as a feedforward estimation using a look-up table relating various throttle valve positions to engine pumping losses and engine speeds. In some implementations, the method further comprises: determining, by the control system, a feedback error based on the difference between the desired and actual engine pumping losses; and adjusting, by the control system, the throttle valve position from the initial throttle valve position is performed based on the feedback error.

In some implementations, the method further comprises performing, by the control system, a closed-loop proportional-integral (PI) control scheme in determining the feedback error and adjusting the throttle valve position. In some implementations, the desired pumping loss corresponds to a maximum amount of engine pumping loss reduction that the MGU is able to convert to the electrical energy for charging the battery system. In some implementations, the DFSO event corresponds to an accelerator pedal of the vehicle being at a rest position and the throttle valve being at a minimum operating position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, typical mild hybrid vehicle control systems utilize a non-linear empirical approach to control the throttle valve during deceleration fuel shutoff (DSFO) to decrease engine pumping losses. This approach requires extensive calibration effort and memory storage for each application. Accordingly, a system and a method for a mild hybrid vehicle are presented that utilize the readily available production forward model for engine pumping loss estimation and a feedback, closed-loop control scheme for the throttle valve based on desired versus actual pumping loss with a feedforward estimation of throttle valve position based desired pumping loss and engine speed. These techniques provide for very accurate throttle valve control during DFSO to minimize pumping loss and improve battery system charging, thereby increasing overall vehicle efficiency (e.g., fuel economy), while also maintaining the desired vehicle drivability (e.g., the same coast-down behavior expected by a driver). These techniques also do not suffer from the extensive calibration effort and memory storage requirements of typical mild hybrid vehicle control systems.

Figure 1:
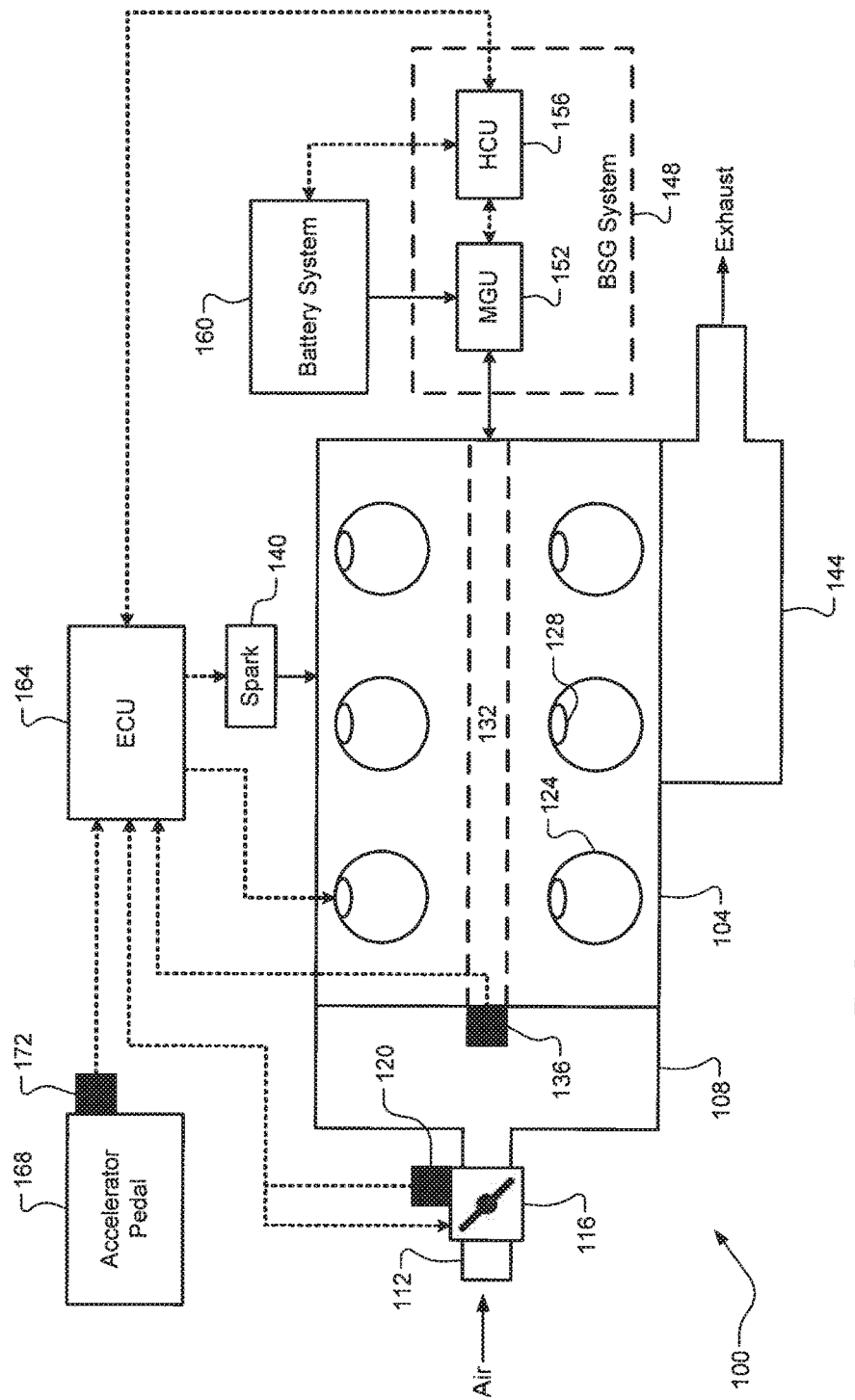
FIG. 1 is a diagram of an example mild hybrid vehicle according to the principles of the present disclosure.

Referring now to FIG. 1, a diagram of an example mild hybrid vehicle 100 is illustrated. The vehicle 100 includes an engine 104 that draws air into an intake manifold 108 via an induction system 112 that is selectively regulated by a throttle valve 116. The throttle valve 116 is opened and closed (e.g., electronic throttle control, or ETC) by an actuator (not shown) and a position of the throttle valve 116 is measured by a throttle position sensor (TPS) 120. While a single TPS 120 is illustrated, it will be appreciated that two or more throttle position sensors could be utilized (e.g., two sensors sensing relative to fully-open and fully-closed positions, respectively). The air in the intake manifold 108 is provided to a plurality of cylinders 124 and the air is combined with a liquid fuel (e.g., gasoline) from respective fuel injectors 128 to form an air/fuel mixture. While six cylinders are shown, it will be appreciated that the engine 104 could include any other number of cylinders. It will also be appreciated that other suitable liquid or gaseous fuels could be utilized (diesel fuel, natural gas, etc.).

The air/fuel mixture is compressed within the cylinders 124 by respective pistons (not shown) and the compressed air/fuel mixture is ignited to drive the pistons and generate drive torque at a crankshaft 132. An engine speed sensor 136 measures a rotational speed of the crankshaft 136 (e.g., in revolutions per minute, or RPM). As shown, the engine is a spark-ignition (SI) engine where ignition of the compressed air/fuel mixture is performed by spark plugs 140 associated with the cylinders 124. It will be appreciated, however, the auto-ignition of the compressed air/fuel mixture could be utilized (e.g., a compressed-ignition or CI engine, such as a diesel engine). Exhaust gas resulting from combustion of the air/fuel mixture is expelled from the cylinders 128 into an exhaust system 144. The majority of the drive torque is transferred from the crankshaft 132 to a driveline (not shown) of the vehicle 100 via a manual or automatic transmission (not shown).

The crankshaft 132 is also physically coupled (e.g., by a belt, a chain, or the like) to a belt-driven starter generator (BSG) system 148 including a motor generator unit (MGU) 152 and a hybrid controller or hybrid control unit (HCU) 156. The MGU 152 is also electrically connected to a battery system 160 of the vehicle 100. In one exemplary implementation, the battery system 160 is a 48 volt battery pack, but it will be appreciated that the battery system 160 could be any suitable battery system (e.g., a 12 volt lead-acid battery). The hybrid controller 156 monitors or estimates parameters of the battery system 160 (voltage, current, resistance, state of charge (SOC), etc.). The BSG system 148 operates the MGU 152 as either a torque generator or a torque consumer. When operating as a torque consumer, the MGU 152 converts the kinetic or mechanical energy at the crankshaft 132 to electrical energy (e.g., current) to charge the battery system 160. When operating as a torque generator, on the other hand, the MGU 152 is powered by electrical energy from the battery system 160 to drive the crankshaft 132 (e.g., to start or restart the engine 104).

An engine controller or engine control unit (ECU) 164 controls operation of the engine 104, including, but not limited to, controlling the throttle valve 116, the fuel injectors 128, the spark plugs 140. The engine controller 164 also receives inputs, such as a position of the throttle valve 116 from the TPS 120, the engine speed from the engine speed sensor 136, as well as a position of an accelerator pedal 168 as measured by a respective position sensor 172. The hybrid controller 156 and the engine controller 164 are referred to collectively as a "control system" of the vehicle 100. More particularly, these controllers 156, 164 collectively implement at least a portion of the techniques of the present disclosure. For example, as discussed in greater detail below, the hybrid controller 156 could provide a parameter of the battery system 160 (e.g., SOC) to the engine controller 164, which could control the throttle valve 116 accordingly.

Figure 2:
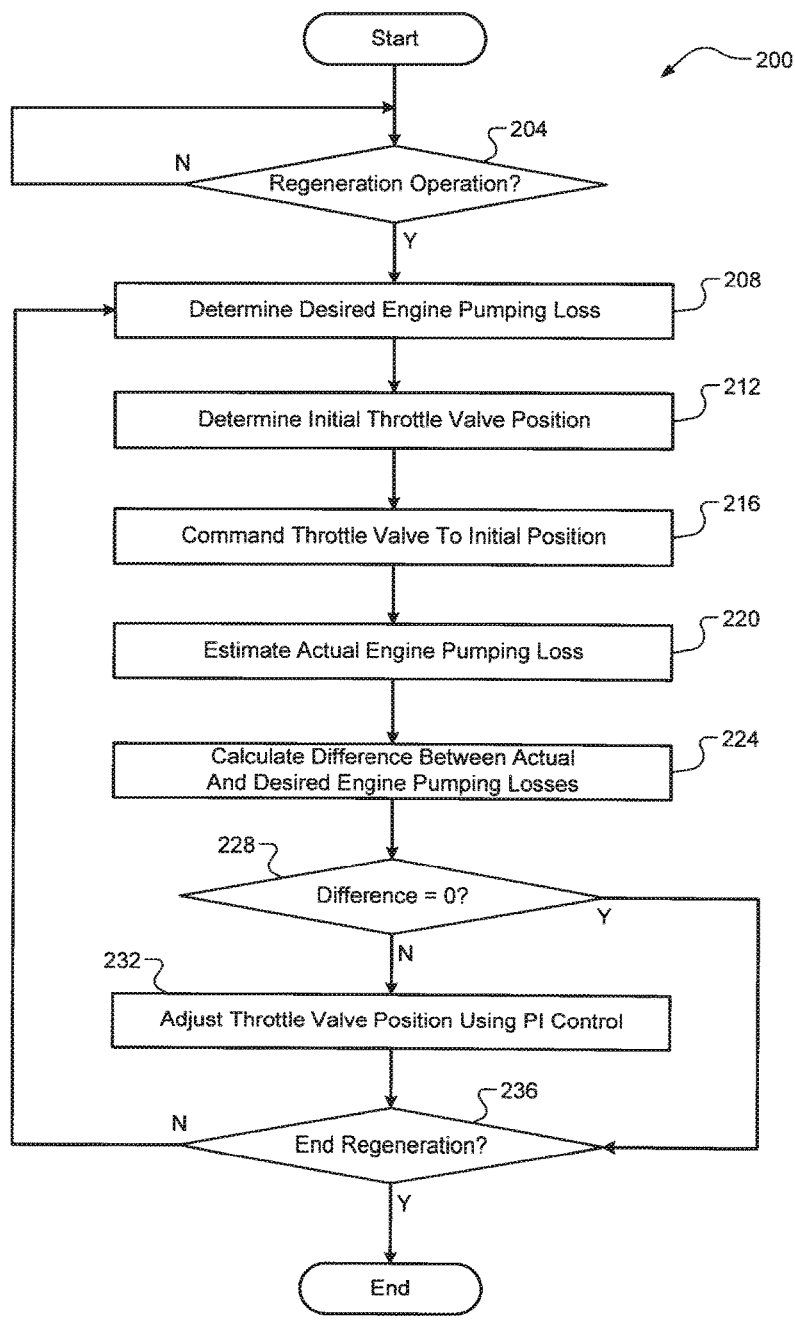
FIG. 2 is a flow diagram of an example method of operating a mild hybrid vehicle according to the principles of the present disclosure.

Referring now to FIG. 2, a flow diagram of an example method 200 of operating the vehicle 100 is illustrated. At 204, the control system detects whether conditions are acceptable to perform a regeneration or recharging operation for the battery system 160. In one exemplary implementation, this includes a DFSO event starting and the throttle valve 116 being at its minimum operating position (e.g., closed). If true, the method 200 proceeds to 208. Otherwise, the method ends or returns to 204. For example, when the accelerator pedal 168 is at a rest position (i.e., no depression), the DFSO event could be initiated by disabling or deactivating the fuel injectors 128. The DFSO event could further include other operations, such as disabling or deactivating the spark plugs 140, closing intake and/or exhaust valves (not shown) of the cylinders 124, and the like. At 208, the control system (e.g., the hybrid controller 156) determines the desired engine pumping loss based on at least one parameters of the battery system 160 (e.g., SOC). The desired engine pumping loss may also be described as a desired engine pumping loss reduction corresponding to a desired amount that the throttle valve 116 should be opened (e.g., from fully-closed) for optimal electricity generation by the MGU 152 while also maintaining desired or expected vehicle coast down performance.

At 212, the control system (e.g., the engine controller 164) determines an initial position for the throttle valve 116 based on the desired engine pumping loss and the engine speed. In one exemplary implementation, this is a feedforward estimation using a look-up table relating various throttle valve positions to various engine pumping losses and engine speeds. At 216, the control system (e.g., the engine controller 164) commands the throttle valve 116 to the initial position. At 220, the control system (e.g., the engine controller 164) estimates an actual pumping loss of the engine. In one exemplary implementation, this estimation is based on modeled or measured airflow into the engine 104 and, in some cases, other related parameters. At 224, the control system (e.g., the engine controller 164) calculates a difference between the actual and desired engine pumping losses.

At 228, the control system (e.g., the engine controller 164) determines whether the difference equals zero. It will be appreciated, however, that this determination at 228 could be whether the difference is within a threshold amount from zero (i.e., approximately zero). If true, the method 200 proceeds to 236. Otherwise, the method 200 proceeds to 232. At 232, the control system (e.g., the engine controller 164) adjusts the position of the throttle valve 116 based on the difference. In one exemplary implementation, the difference represents a feedback error for a proportional-integral (PI) control scheme for the throttle valve 116. At 236, the control system determines whether to end the regeneration or recharging operation for the battery system 160. This could include determining that the DFSO event is ending and/or whether the parameter of the battery system 160 (e.g., SOC) has reached a predetermined level (e.g., 100%) or is within a threshold amount from the predetermined level (e.g., ~100%). If true, the method 200 ends or returns to 204. Otherwise, the method 200 returns to 208.

It will be appreciated that the terms "controller" and "control unit" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for a mild hybrid vehicle, the system comprising:
   a belt-driven starter generator (BSG) system including a motor generator unit (MGU) physically coupled to a crankshaft of an engine of the vehicle, the MGU being electrically connected to a battery system of the vehicle; and
   a control system configured to:
   detect a deceleration fuel shutoff (DFSO) event where fueling to the engine is disabled; and
   in response to detecting the DFSO event:
   determine a desired pumping loss for the engine based on a parameter of the battery system, the desired pumping loss corresponding to a desired amount of electrical energy that the MGU will generate to charge the battery system;
   determine an initial position for a throttle valve of the engine based on the desired engine pumping loss and a speed of the engine;
   command the throttle valve to the initial position;
   estimate an actual pumping loss of the engine based on an estimated airflow into the engine; and
   adjust the position of the throttle valve based on a difference between the desired and actual engine pumping losses.

2. The system of claim 1, wherein the control system is configured to adjust the position of the throttle valve based on the difference between the desired and actual engine pumping losses for a remainder of the DFSO event.

3. The system of claim 1, wherein the parameter of the battery system is a state of charge (SOC) of the battery system, and wherein the control system is configured to adjust the position of the throttle valve based on the difference between the desired and actual engine pumping losses until the SOC reaches a predetermined SOC.

4. The system of claim 1, wherein the control system is configured to determine the initial throttle valve position as a feedforward estimation using a lookup table relating various throttle valve positions to engine pumping losses and engine speeds.

5. The system of claim 3, wherein the control system is further configured to determine a feedback error based on the difference between the desired and actual engine pumping losses and to adjust the throttle valve position from the initial throttle valve position based on the feedback error.

6. The system of claim 4, wherein the control system is configured to perform a closed-loop proportional-integral (PI) control scheme in determining the feedback error and adjusting the throttle valve position.

7. The system of claim 1, wherein the desired pumping loss corresponds to a maximum amount of engine pumping loss reduction that the MGU is able to convert to the electrical energy for charging the battery system.

8. The system of claim 1, wherein the DFSO event corresponds to an accelerator pedal of the vehicle being at a rest position and the throttle valve being at a minimum operating position.

9. A method of operating a mild hybrid vehicle having a belt-driven starter generator (BSG) system including a motor generator unit (MGU) physically coupled to a crankshaft of an engine of the vehicle and electrically connected to a battery system of the vehicle, the method comprising:
- detecting, by a control system of the vehicle, a deceleration fuel shutoff (DFSO) event where fueling to the engine is disabled; and
- in response to detecting the DFSO event:
    - determining, by the control system, a desired pumping loss for the engine based on a parameter of the battery system, the desired pumping loss corresponding to a desired amount of electrical energy that the MGU will generate to charge the battery system;
    - determining, by the control system, an initial position for a throttle valve of the engine based on the desired engine pumping loss and a speed of the engine;
    - commanding, by the control system, the throttle valve to the initial position;
    - estimating, by the control system, an actual pumping loss of the engine based on an estimated airflow into the engine; and
    - adjusting, by the control system, the position of the throttle valve based on a difference between the desired and actual engine pumping losses.

10. The method of claim 9, wherein adjusting the position of the throttle valve based on the difference between the desired and actual engine pumping losses is performed for a remainder of the DFSO event.

11. The method of claim 9, wherein the parameter of the battery system is a state of charge (SOC) of the battery system, and wherein adjusting the position of the throttle valve based on the difference between the desired and actual engine pumping losses is performed until the SOC reaches a predetermined SOC.

12. The method of claim 9, wherein the initial throttle valve position is determined as a feedforward estimation using a look-up table relating various throttle valve positions to engine pumping losses and engine speeds.

13. The method of claim 12, further comprising:
- determining, by the control system, a feedback error based on the difference between the desired and actual engine pumping losses; and
- adjusting, by the control system, the throttle valve position from the initial throttle valve position is performed based on the feedback error.

14. The method of claim 13, further comprising performing, by the control system, a closed-loop proportional-integral (PI) control scheme in determining the feedback error and adjusting the throttle valve position.

15. The method of claim 9, wherein the desired pumping loss corresponds to a maximum amount of engine pumping loss reduction that the MGU is able to convert to the electrical energy for charging the battery system.

16. The method of claim 9, wherein the DFSO event corresponds to an accelerator pedal of the vehicle being at a rest position and the throttle valve being at a minimum operating position.

* * * * *